United States Patent
Brunn et al.

(10) Patent No.: US 10,432,566 B2
(45) Date of Patent: Oct. 1, 2019

(54) DETERMINING MEMBERSHIP CAUSES FOR NEW USER AND CONTINUED INVOLVEMENT IN SOCIAL NETWORK SITES

(71) Applicant: International Business Machines Corporation, Armonk, NY (US)

(72) Inventors: Jonathan F. Brunn, Logan, UT (US); Jeffrey R. Hoy, Gibsonia, PA (US); Marit L. Imsdahl, Cary, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 14/947,868

(22) Filed: Nov. 20, 2015

(65) Prior Publication Data
US 2017/0149851 A1 May 25, 2017

(51) Int. Cl.
*G06Q 50/00* (2012.01)
*H04L 12/58* (2006.01)
*H04L 29/08* (2006.01)

(52) U.S. Cl.
CPC ............. *H04L 51/24* (2013.01); *G06Q 50/01* (2013.01); *H04L 51/32* (2013.01); *H04L 67/22* (2013.01)

(58) Field of Classification Search
CPC combination set(s) only.
See application file for complete search history.

(56) References Cited

U.S. PATENT DOCUMENTS

| | | | |
|---|---|---|---|
| 6,742,032 B1 | 5/2004 | Castellani et al. | |
| 7,069,308 B2 * | 6/2006 | Abrams | G06Q 10/10 705/319 |
| 8,388,446 B1 * | 3/2013 | Craine | A63F 13/48 463/42 |
| 8,449,396 B2 * | 5/2013 | Craine | A63F 13/48 463/42 |
| 8,539,030 B2 * | 9/2013 | Wang Baldonado | G06Q 10/107 709/206 |
| 8,856,141 B1 | 10/2014 | Dean et al. | |
| 8,903,909 B1 | 12/2014 | Marra et al. | |
| 8,943,136 B2 | 1/2015 | Faller et al. | |

(Continued)

OTHER PUBLICATIONS

Office Action dated Mar. 28, 2018 received in U.S. Appl. No. 14/947,794, 16 pages.

(Continued)

*Primary Examiner* — Edward Kim
(74) *Attorney, Agent, or Firm* — Scully, Scott, Murphy & Presser, P.C.; L. Jeffrey Kelly, Esq.

(57) ABSTRACT

Determining a reason a user joins a computer-implemented social network service may include automatically monitoring access to content in a social network site by a newly added member of the social network service to form an initial access history of user interactions with the social network site. The initial access history spans a predetermined period of time within a time of the newly added member joining the social network service. The initial access history may be analyzed to determine the reason for joining the social network service by the newly added member. The reason may be automatically leveraged to improve membership participation in the computer-implemented social network service.

15 Claims, 4 Drawing Sheets

(56) References Cited

U.S. PATENT DOCUMENTS

| | | | |
|---|---|---|---|
| 2005/0021750 A1* | 1/2005 | Abrams | G06Q 10/10 |
| | | | 709/225 |
| 2007/0168446 A1* | 7/2007 | Keohane | G06Q 10/107 |
| | | | 709/207 |
| 2009/0177744 A1* | 7/2009 | Marlow | G06Q 10/10 |
| | | | 709/204 |
| 2010/0174747 A1 | 7/2010 | Farrell et al. | |
| 2010/0332330 A1 | 12/2010 | Goel et al. | |
| 2011/0196922 A1* | 8/2011 | Marcucci | H04W 4/21 |
| | | | 709/204 |
| 2011/0246907 A1* | 10/2011 | Wang | G06Q 30/0224 |
| | | | 715/751 |
| 2011/0258055 A1 | 10/2011 | Abbott | |
| 2011/0320533 A1* | 12/2011 | Belinsky | G06F 16/958 |
| | | | 709/203 |
| 2012/0054277 A1* | 3/2012 | Gedikian | G06Q 10/10 |
| | | | 709/204 |
| 2012/0102114 A1* | 4/2012 | Dunn | G06Q 10/10 |
| | | | 709/204 |
| 2012/0136929 A1* | 5/2012 | Li | G06Q 10/101 |
| | | | 709/203 |
| 2012/0158843 A1* | 6/2012 | Angani | G06Q 30/02 |
| | | | 709/204 |
| 2012/0203846 A1 | 8/2012 | Hull et al. | |
| 2012/0226544 A1 | 9/2012 | Merrifield | |
| 2013/0030905 A1 | 1/2013 | Fuloria et al. | |
| 2013/0054714 A1* | 2/2013 | Bedi | G06Q 10/10 |
| | | | 709/206 |
| 2013/0061296 A1 | 3/2013 | Reddy et al. | |
| 2013/0159110 A1 | 6/2013 | Rajaram et al. | |
| 2013/0268591 A1 | 10/2013 | Chen et al. | |
| 2013/0304822 A1* | 11/2013 | Tetreault | H04N 21/2187 |
| | | | 709/204 |
| 2013/0325948 A1 | 12/2013 | Chen et al. | |
| 2014/0129627 A1* | 5/2014 | Baldwin | H04L 67/306 |
| | | | 709/204 |
| 2014/0189013 A1* | 7/2014 | Abhyanker | G06Q 10/087 |
| | | | 709/204 |
| 2014/0278852 A1 | 9/2014 | Kulish | |
| 2016/0182434 A1 | 6/2016 | Systrom et al. | |

OTHER PUBLICATIONS

Office Action dated Nov. 1, 2018 received in U.S. Appl. No. 14/947,794, 14 pages.

Notice of Allowance dated Feb. 25, 2019 received in U.S. Appl. No. 14/947,794, 26 pages.

* cited by examiner

DETERMINING MEMBERSHIP CAUSES FOR NEW USER AND CONTINUED INVOLVEMENT IN SOCIAL NETWORK SITES

FIELD

The present application relates generally to computers and computer applications, and more particularly to computer-implemented social networks and social networking sites.

BACKGROUND

A social network service or site provides a computer-implemented platform that builds social networks or social relations among users. For example, a social network site allows a user to connect to others who may share interests, and for example, form a group or network of connections with others. A social network service may includes a user profile that represents the user, the user's social links (e.g., friends), and other services. Social network sites may be web-based services that allow individuals to communicate with one another over the Internet or like communications network.

While many social network services or sites are currently available for users to join, the actual reason as to why the user is attracted to joining a social network service has not been explored.

BRIEF SUMMARY

A computer system and computer-implemented method of determining a reason a user joins a computer-implemented social network service may be provided. The method, in one aspect, may include automatically monitoring access to content in a social network site by a newly added member of the social network service to form an initial access history of user interactions with the social network site, the initial access history spanning a predetermined period of time within a time of the newly added member joining the social network service. The method may also include analyzing the initial access history to determine the reason for joining the social network service by the newly added member. The analyzing may include identifying in the initial access history one or more of a uniform resource locator (URL) or a uniform resource identifier (URI) representing an item or a link to an item on a network of computers and determining content of the item to be the reason.

A system of determining a reason a user joins a computer-implemented social network service, in one aspect, may include one or more hardware processors operable to automatically monitor access to content in a social network site by a newly added member of the social network service. One or more of the hardware processors may be further operable to generate an initial access history of user interactions with the social network site, the initial access history spanning a predetermined period of time within a time of the newly added member joining the social network service. A storage device may be coupled to one or more of the hardware processors. One or more of the hardware processors may be further operable to store the initial access history on the storage device. One or more of the hardware processors may be further operable to analyze the initial access history to determine the reason for joining the social network service by the newly added member, by at least identifying in the initial access history one or more of a uniform resource locator (URL) or a uniform resource identifier (URI) representing an item or a link to an item on a network of computers, and determining content of the item to be the reason.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

There may be many reasons a user joins a social network. A computer-implemented automatic method that extrapolates this reason can be factored into a user profile indicating the user's interests. The user's reason for joining not only enhances the calculation of user interests but also reduces the learning time it takes to assess user's interests based on action history. The user's reason for joining can enhance the social network's attempts to encourage users who may have reduced their activity by using their original interest for joining the social network; users with similar profiles and relationships can also be encouraged in the same manner.

A method, system and/or techniques in one embodiment of the present disclosure may determine a reason a user joins a computer-implemented social network. The method, system and/or techniques of the present disclosure in one embodiment using this information may re-engage that particular user if the user starts to disengage from the social network. When a post on the social network server or the like is found that causes users to join, the method, system and/or techniques of the present disclosure in embodiment may entice more new users to join based on this post.

Based on one or more reasons a user joins a social network, a method in one embodiment may customize the posts, notifications, alerts to the user, and thus keep the user's interest. For example, if the user joined a social network to share photos with a relative in a different country, then the method may use the relationship associations to suggest other users on the social network and/or photographs posts on the social network to keep the user's interest. In one aspect, not only can this information help maintain the current user's interests, but also encourage new users to join.

A method and/or system in one embodiment may analyze relationships to target other non-members with similar relationships. For example, to promote the content (e.g., family photos) that other users may be interested in, a method in one embodiment may mine the user's address book to send a targeted email with invitation to also join by indicating the current user's interest and his/her reason for joining. In this way, for example, the reason for the user's membership can enhance the user experience and maintain interest, and can also encourage other non-members who may have the same interest to join.

In one aspect, the original interest of the user can be used to assess the demographics of all the users' interests. The information, for example, the statistics can be used to predict new users in the future. For example, if there are x new users that have joined the social network to follow a political commentator around the y month of the year timeframe, then next year similar behavior can be expected and predicted.

Figure 1:
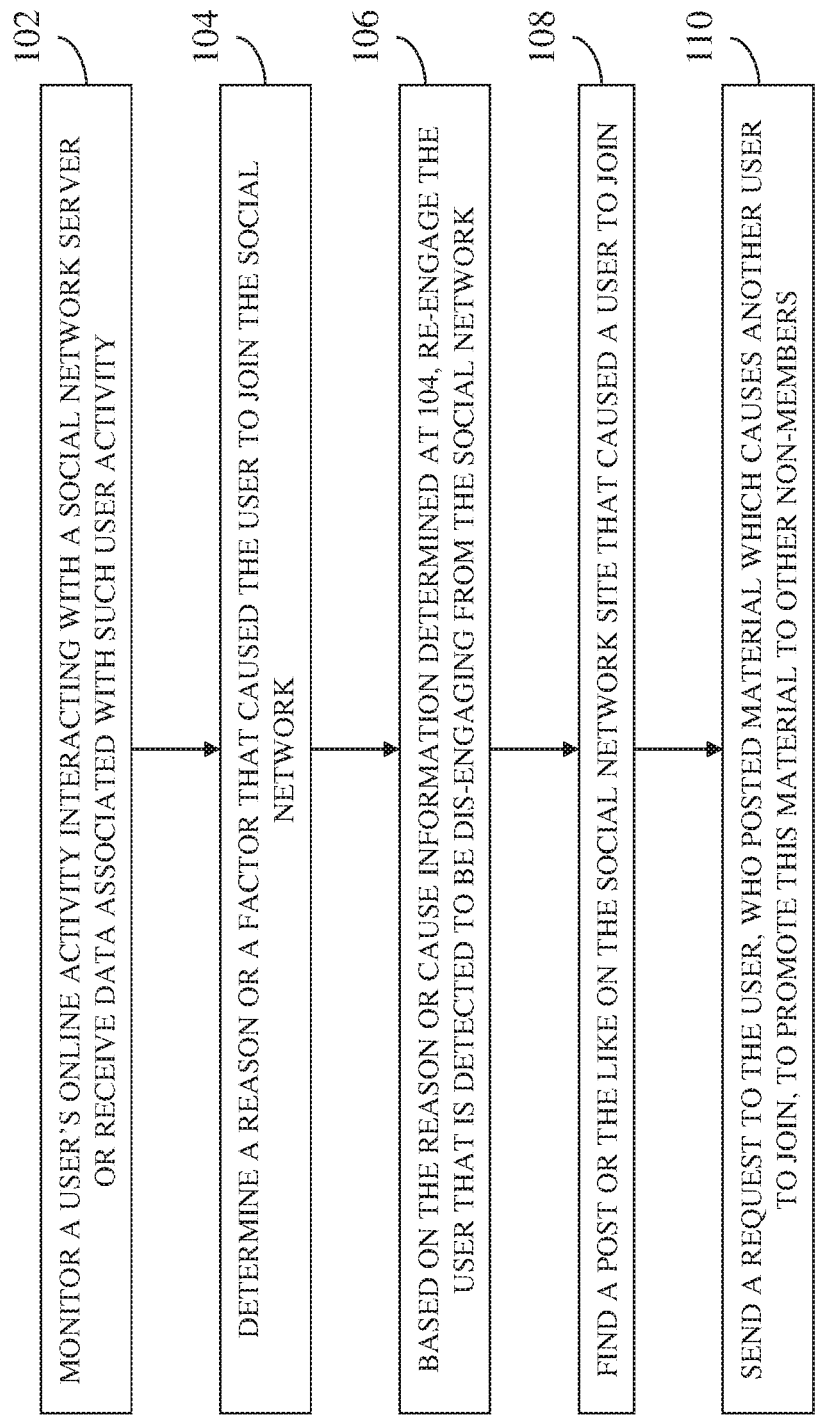
FIG. 1 is a flow diagram illustrating a method of determining a reason that a user joins a social network in one embodiment of the present disclosure.

A methodology in one embodiment of the present disclosure analyzes a user's action to determine the cause or the reason the user joins or joined a network. FIG. 1 is a flow diagram illustrating a method of determining a reason that a user joins a social network in one embodiment of the present disclosure. At 102, data associated with a user's online activity interacting with a social network server may be monitored and/or received.

At 104, a reason or a factor that caused the user to join the social network may be determined. For instance, user activity such the first item(s) the user clicks on or views, for example, after logging on or signing into the social network, time spent on each of those items, level of engagement with an item, and/or links used to access the network initially, may be analyzed. As an example, a computer system coupled to the social network may send one or more emails based on one or more actions from a member to share an item on the social network with a non-member. The methodology of the present disclosure in one embodiment may track when that email and link caused the non-member to join or first access the social network site.

An example of a technique for determining a user's cause of joining the social network site may include determining the initial or first Uniform Resource Locator (URL) visited by the user, for example, within a threshold or predetermined time of the user joining the social network site. If the initial of first URL is an item specific URL or URL which indicates a specific item (for instance, photo, news article) or a link generated on a post or article on another web site where the links may be generated to identify that item, then that particular content by a Uniform Resource Identifier (URI) is determined to be the reason for the user joining the social network.

Another example technique may include searching for or identifying a set of URIs representing a resource the user interacted with, for example, on the visit where the user signs up or within a given amount of time after signing up. A social graph associated with the social network, e.g., managed by the social network server or site is queried or traversed to find an attribute that is most common across the URIs the user first interacted with. For instance, the user may interact with User J:profilePhoto and User J:about and User J:photoStream:photo1 and photo2:tagsCollection:User J, then User J may be the common element where a set depth is used in traversing the graph or where attributes are weighted based on the depth to the attribute. In one embodiment, the attributes may also be weighted by the time spent on the items with that attribute. For example, even if only 1 item was clicked with a particular attribute, if that item is interacted with the most, that item may be determined to be the cause.

In one aspect, the system may use user actions to infer the importance of types of content and adjust notifications based on this inference. For instance, content inferred to contribute to the cause or reason for a user joining the network may be identified and based on the inference, notifications may be sent to one or more users.

At 106, using the reason or cause information determined at 104, the methodology of the present disclosure in one embodiment may re-engage the user that is detected to be disengaging from the social network site. For instance, the methodology of the present disclosure in one embodiment may identify a decrease in the user's viewing or accessing of the items on the social network site or in the user's interactions on the site to detect that the user's interaction with the social network site is trailing off. Responsive to detecting that the user's interaction with the social network site is trailing off, the methodology may recommend or increase recommendations of similar items to those which drew the user to the network in the first place. These recommendations may be provided as a notification through the user's normal news feed or notification system, or as a targeted notification such a mobile notification or email with the intent of getting the user to re-engage. "Similar items" in one embodiment are defined according to a categorization of recommendable items by type (e.g., photo, link, survey/poll, document, etc.) or subject matter (personal, work, based on tags or other auto-classification). For instance, items may be categorized as "personal", "photo", "news story", "political", etc.

At 108, the methodology may include finding a post or the like on the social network site that caused a user to join. The methodology in one embodiment may use the post or the like to entice more new users to join.

At 110, the methodology in one embodiment may request the user, who posted material which causes another user to join, to promote this material to other non-members. For example, a system that implements the methodology in one embodiment may be coupled to or has access to a list of potential members who are not currently signed up for the social network service, and knows that one or more of the potential members have a relationship with the poster. Such information may be derived from the user's address book and common features to use the address book for an individual to load or search for connections in the social network. The user may be requested to send an email or another notification to the potential members to ask them to join the social network service or site. In one aspect the system may automatically send such email or notification, for example, based on the user's authorization to do so.

For posts which have already caused a user to join, the system of the present disclosure in one embodiment may ask the poster whether the poster would like to share the post with other non-members. For instance, the poster may receive a message, for example, on a social network site display or display window on a display device, such as: "User A found this content interesting and joined the network. We found other users in your address book who might be interested. Do you want to invite User B (potential user) to join and view this content?"

The methodology in one embodiment of the present disclosure may specifically look or search for users who are not members of the social network, for example, to drive greater adoption of the social network. In another respect, the methodology of the present disclosure in one embodiment may specifically avoid recommending (e.g., do NOT recommend) sharing with users who are already in the social network, for example, since it may be assumed the normal following and targeting rules of the social network may appropriately send the notifications to appropriate users who are already in the social network.

The following describes example use cases of the methodology of the present disclosure in one embodiment.

Example Use Case 1

User A joins a social network and looks for family photos. The system in one embodiment of the present disclosure assesses that User A's motivational interest for joining the social network is family photos. In one example, the system may mine or search User A's address book, and identify users (e.g., 10 users) that are not members of the social network. It also identifies that a number of those user (e.g., 5 of those users) are members of User A's family. The system may send out emails that User A is using the social network to view family photos, inviting those 5 members to also join. In one aspect, after several months, the system of the present disclosure in one embodiment determines or detects that User A has not been using the social network as often (e.g., as compared to a threshold value, e.g., number of visits to the social network site, amount of time spent on the social network site). The system may send out an email or another notification to User A that more family photos have been uploaded to encourage User A to resume activity on the social network.

Example Use Case 2

User A posts a topic X status on a social network. The system detects that other new users (e.g., 5 new users) join and their first step is to search for User A and read User A's status. The system assesses that those 5 new members are interested in the topic of the topic X post regarding local institution Y. The system assesses that for those users that their interest lies in the topic X article on the local institution Y. The system notifies the new users with other articles on topic X related to other areas or companies, and newsletters on the local institution Y. As an example, one of the new users, User C, proceeds to like (e.g., indicates approval via a user interface element on the social network site web page) the newsletter on the local institution Y, and disregards the other articles on topic X. The system may assess that User C's interest only lies in the local institution. As another example, one of the new users, User D, proceeds to like (e.g., indicates approval via a user interface element on the social network site web page) both the newsletter on the local institution, and the other articles on topic X. The system may assess that User D's interest lies both in the local institution and any controversial articles of topic X. Based on the interest information so identified, the system may update the user's profiles and interests and may store them in a storage or memory device.

Example Use Case 3

User A posts a status on a social network regarding the local town elections. 5 new users join and their first step is to search for User A and read her status. The system may predict approximately 5 new members may join next year with interest in the local town political race.

Figure 2:
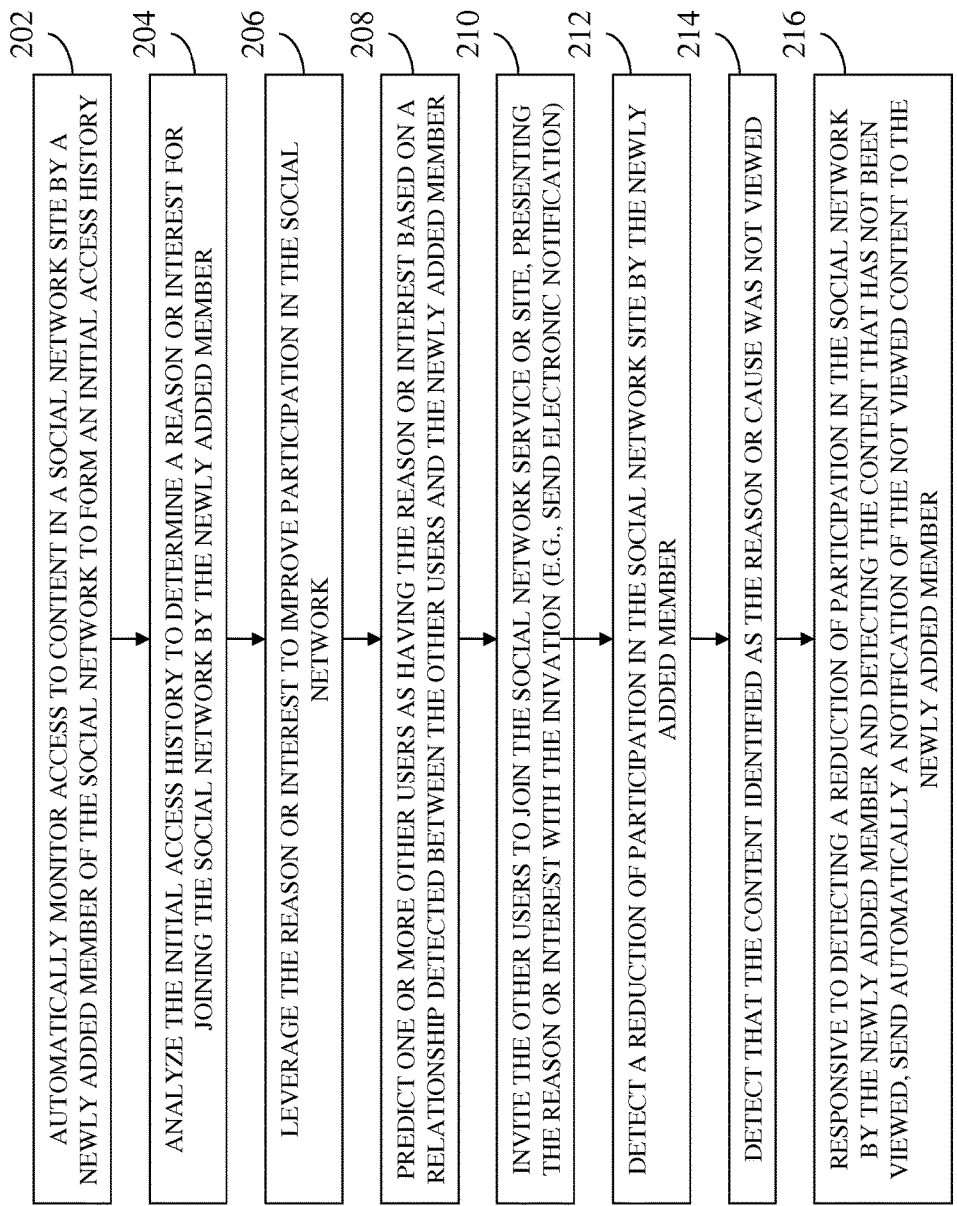
FIG. 2 is a flow diagram illustrating a method of determining a reason a user joins a social network and leveraging the reason for improving participation in the social network, in one embodiment of the present disclosure.

FIG. 2 is a flow diagram illustrating a method of determining a reason a user joins a social network and leveraging the reason for improving participation in the social network, in one embodiment of the present disclosure. At 202, the method in one embodiment may include automatically monitoring access to content in a social network site by a newly added member of the social network to form an initial access history.

At 204, the method may include analyzing the initial access history to determine a reason or interest for joining the social network by the newly added member. In one aspect, the reason is confirmed by an answer to a request for information by the newly added member. In another aspect, the reason is determined by applying natural language processing (NLP) and analytic analysis to information derived from URLs the user visited. For instance, the initial access history may include user activities spanning a predetermined period of time within the time of the newly added member joining the social network service. The initial access history may be analyzed to identify in the initial access history one or more of a uniform resource locator (URL) or a uniform resource identifier (URI) representing an item or a link to an item on a network of computers. The content associated with the item may be determined to be the reason the newly added member joined the social network service.

At 206, the method may include leveraging the reason or interest for improving participation in the social network. For example, at 208, the method may include predicting other users as having the reason or interest based on a relationship detected between the other users and the newly added member. At 210, the method may include inviting the other users to join the social network service or site with presenting the reason or interest. For instance, electronic notification may be transmitted.

At 212, the method may include detecting a reduction of participation in the social network site by the newly added member. At 214, the method may also include detecting that the content identified as the reason or cause was not viewed. At 216, responsive to detecting a reduction of participation in the social network by the newly added member and a detecting the content that has not been viewed, the method may include sending automatically a notification of the not viewed content to the newly added member. Example content determined to be the reason may comprise pictures or images and the reason determined may be sharing of the pictures or images. Other examples of the reason may include, but are not limited to, a focus group, an activity, group interest, demography.

Figure 3:
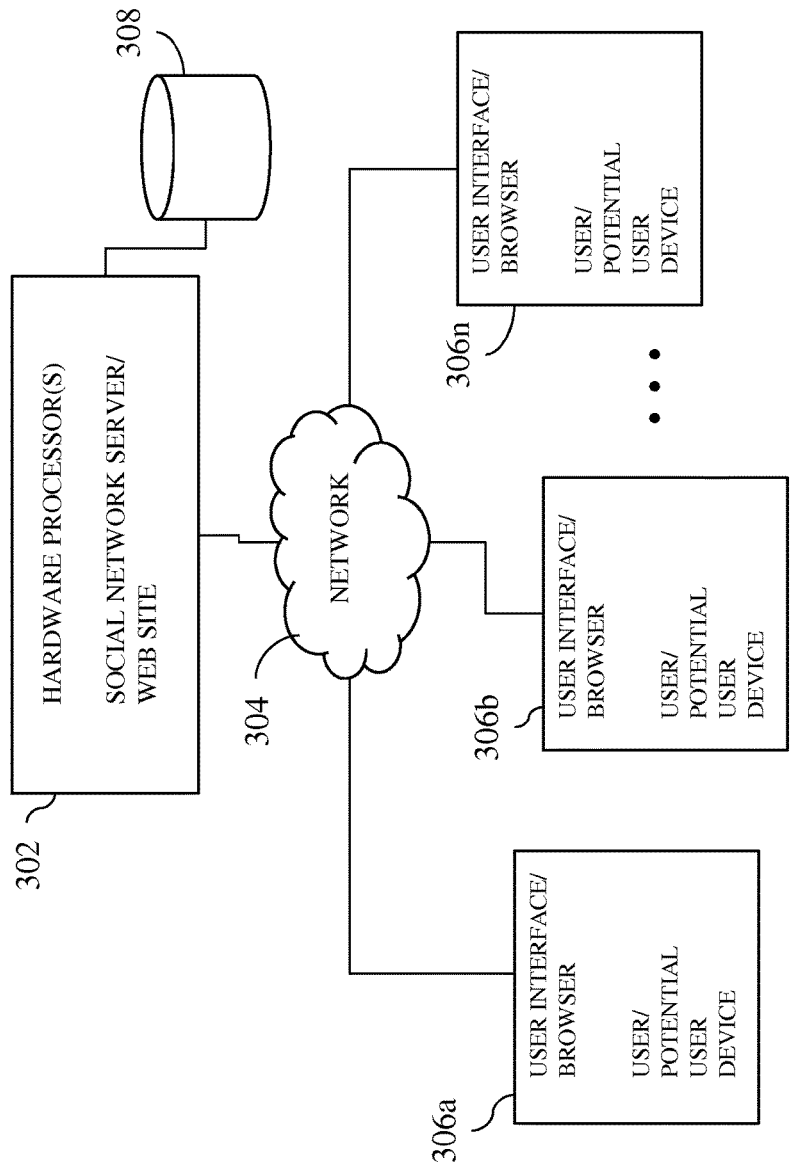
FIG. 3 is a diagram illustrating an overview of system components in one embodiment of the present disclosure.

FIG. 3 is a diagram illustrating an overview of system components in one embodiment of the present disclosure. A social network server 302 may run on one or more hardware processors, and provide a web site with which one or more users via respective user devices 306a, 306b, ..., 306n, may interact, for example, over a computer communication network 304. The social network server 302 may integrate or be coupled to a functionality that implements the methods described above, for example, with reference to FIGS. 1 and 2. The one or more user devices 306a, 306b, ..., 306n may run a user interface or a graphical user interface such as a web browser for allowing a user to interact with the social network server 302. Examples of the user devices (e.g., 306a, 306b, ... 306n) may include, but are not limited to, a smartphone, tablet, laptop, other mobile devices, desktop, and others. In one embodiment of the present disclosure, responsive to a user joining a social network, for example, and connecting to the social network server 302 and using the social networking capabilities, the cause or reason the user joined (e.g., 306a) may be determined. The newly added member's activity may be monitored for a predetermined or given period of time of the newly added member joining the social network service. An initial access history may be generated based on the monitoring. The initial access history may be stored in a memory or storage device, e.g., 308. The cause or reason may be determined based on one or more factors such as which URL or URI item the user accesses within a predetermined time of joining the social network, e.g., determined based on analyzing the initial access history. Based on the determined cause or reason, other users (e.g., 306b, 306n) may be notified to join the social network.

Figure 4:
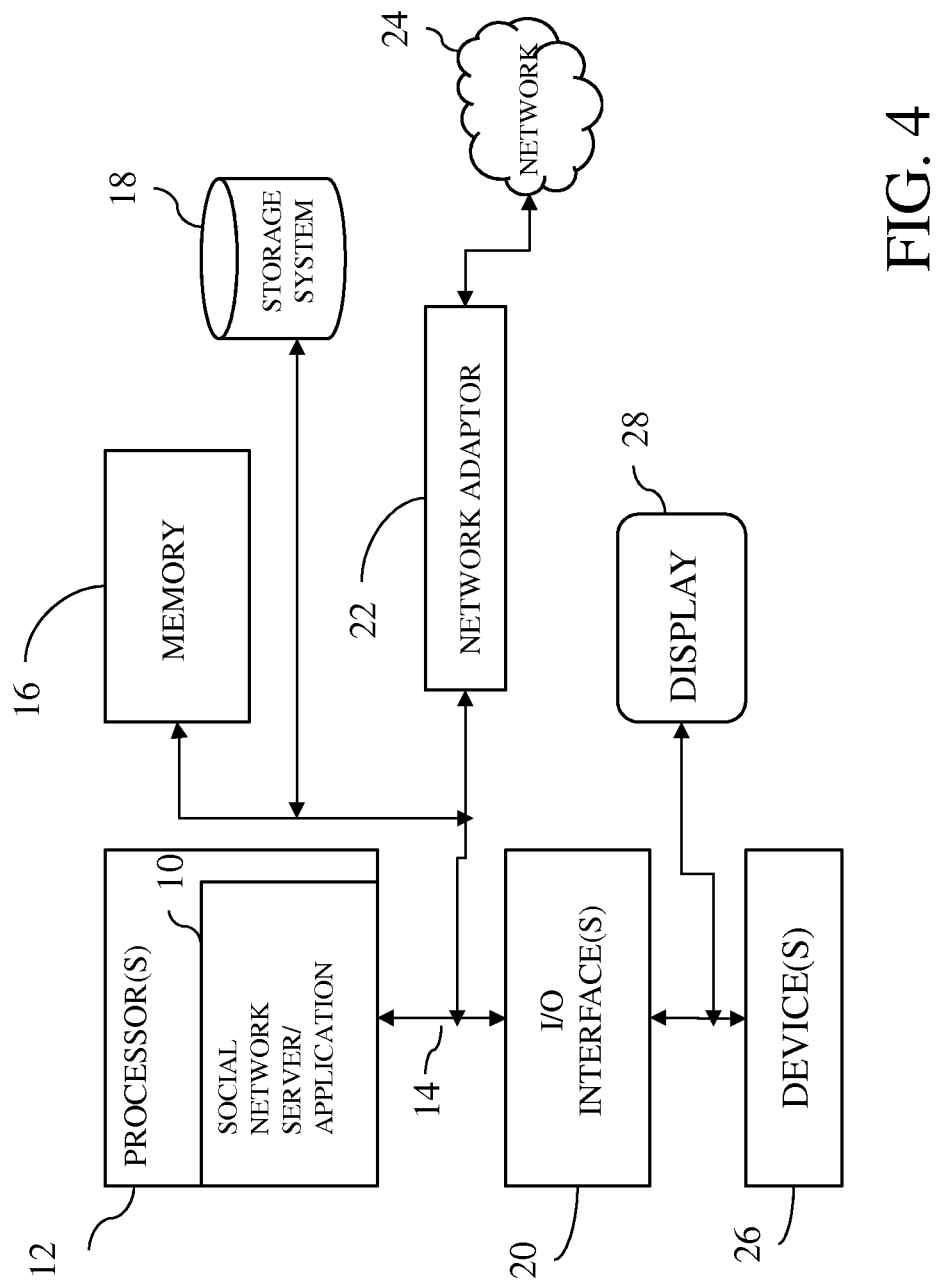
FIG. 4 illustrates a schematic of an example computer or processing system that may implement a system that determines membership causes in a social network site in one embodiment of the present disclosure.

FIG. 4 illustrates a schematic of an example computer or processing system that may implement a system that determines membership causes in a social network site in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of determining a reason a user joins a computer-implemented social network service, the method performed by a social network server executing on at least one processor, comprising:

automatically monitoring access to content in a social network site by a newly added member of the social network service to form an initial access history of user interactions with the social network site, the initial access history comprising at least one uniform resource identifier (URI) representing at least one item the newly added member joining the social network service has accessed within a given amount of time after signing up as a member of the social network service;

analyzing the initial access history to determine the reason for joining the social network service by the newly added member, the analyzing comprising at least:

identifying in the initial access history the at least one uniform resource identifier (URI) representing the at least one item on a network of computers;

determining content of the at least one item, which is reflective of the newly added member's original interest, to be the reason;

requesting the newly added member to confirm the reason; and confirming the reason based on an answer provided by the newly added member; and customizing posts on a social network web page associated with the social network service according to the newly added member's original interest, wherein the initial access history comprises at least a plurality of uniform resource identifiers (URIs), which the newly added member joining the social network service has accessed within the given amount of time after signing up as a member of the social network service, and the content, which is reflective of the newly added member's original interest, is determined as a common feature occurring across the plurality of URIs.

2. The method of claim 1, further comprising:

searching for at least one non-member of the social network service having a relationship with the newly added member, and who have not joined the social network service; and transmitting a notification via a communication network to the at least one non-member of the social network service to join the social network service, the notification further comprising the reason comprising the newly added member's original interest.

3. The method of claim 1, further comprising:

detecting a reduction of participation in the social network site by the newly added member; and sending automatically a notification to the newly added member informing the newly added member that another content related to the item has been posted on the social network site.

4. The method of claim 1, wherein the item comprises at least one of images and text content associated with an interest group.

5. The method of claim 1, further comprising:

searching for postings related to the item posted on the social network site; and sending a notification to at least one non-member of the social network service detected to have a relationship with the newly added member to join the social network service based on the postings.

6. A non-transitory computer readable storage medium storing a program of instructions executable by a machine to perform a method of determining a reason a user joins a computer-implemented social network service, the method comprising:

automatically monitoring access to content in a social network site by a newly added member of the social network service to form an initial access history of user interactions with the social network site, the initial access history comprising at least one uniform resource identifier (URI) representing at least one item the newly added member joining the social network service has accessed within a given amount of time after signing up as a member of the social network service;

analyzing the initial access history to determine the reason for joining the social network service by the newly added member, the analyzing comprising at least:

identifying in the initial access history the at least one uniform resource identifier (URI) representing the at least one item on a network of computers;

determining content of the item, which is reflective of the newly added member's original interest, to be the reason;

requesting the newly added member to confirm the reason;

confirming the reason based on an answer provided by the newly added member; and customizing posts on a social network web page associated with the social network service according to the newly added member's original interest, wherein the initial access history comprises at least a plurality of uniform resource identifiers (URIs), which the newly added member joining the social network service has accessed within the given amount of time after signing up as a member of the social network service, and the content, which is reflective of the newly added member's original interest, is determined as a common feature occurring across the plurality of URIs wherein a social network server executes the method.

7. The non-transitory computer readable storage medium of claim 6, further comprising:

searching for at least one non-member of the social network service having a relationship with the newly added member, and who have not joined the social network service; and transmitting a notification via a communication network to the at least one non-member of the social network service to join the social network service, the notification further comprising the reason comprising the newly added member's original interest.

8. The non-transitory computer readable storage medium of claim 6, further comprising:

detecting a reduction of participation in the social network site by the newly added member; and sending automatically a notification to the newly added member informing the newly added member that another content related to the item has been posted on the social network site.

9. The non-transitory computer readable storage medium of claim 6, wherein the item comprises at least one of images and text content associated with an interest group.

10. The non-transitory computer readable storage medium of claim 6, further comprising:

searching for postings related to the item posted on the social network site; and sending a notification to at least one non-member of the social network service detected to have a relationship with the newly added member to join the social network service based on the postings.

11. A system of determining a reason a user joins a computer-implemented social network service, comprising:

at least one hardware processor comprising at least a social network server, operable to automatically monitor access to content in a social network site by a newly added member of the social network service, the at least one hardware processor further operable to generate an initial access history of user interactions with the social network site, the initial access history comprising at least one uniform resource identifier (URI) representing at least one item the newly added member joining the social network service has accessed within a given amount of time after signing up as a member of the social network service;

a storage device coupled to the at least one hardware processor, the at least one hardware processor further operable to store the initial access history on the storage device;

the at least one hardware processor further operable to analyze the initial access history to determine the reason for joining the social network service by the newly added member, by at least identifying in the initial access history the at least one uniform resource identifier (URI) representing the at least one item on a network of computers, the at least one hardware processor determining content of the at least one item, which is reflective of the newly added member's original interest, to be the reason, the at least one hardware processor further operable to request the newly added member to confirm the reason and further operable to confirm the reason based on an answer provided by the newly added member, the at least one hardware processor further operable to customize posts on a social network web page associated with the social network service according to the newly added member's original interest, wherein the initial access history comprises at least a plurality of uniform resource identifiers (URIs), which the newly added member joining the social network service has accessed within the given amount of time after signing up as a member of the social network service, and the content, which is reflective of the newly added member's original interest, is determined as a common feature occurring across the plurality of URIs.

12. The system of claim 11, wherein the at least one hardware processor is further operable to search for at least one non-member of the social network service having a relationship with the newly added member, and who have not joined the social network service, the at least one hardware processor is further operable to transmit a notification via a communication network to the at least one non-member of the social network service to join the social network service, the notification further comprising the reason comprising the newly added member's original interest.

13. The system of claim 11, wherein the at least one hardware processor is further operable to detect a reduction of participation in the social network site by the newly added member and send automatically a notification to the newly added member informing the newly added member that another content related to the item has been posted on the social network site.

14. The system of claim 11, wherein the item comprises at least one of images and text content associated with an interest group.

15. The system of claim 11, wherein the at least one hardware processor is further operable to search for online postings related to the item posted on the social network site and send a notification to at least one non-member of the social network service detected to have a relationship with the newly added member to join the social network service based on the postings.

* * * * *